United States Patent
Nakamura et al.

(10) Patent No.: US 7,700,211 B2
(45) Date of Patent: Apr. 20, 2010

(54) FUEL CELL, FUEL CELL ELECTRODE AND METHOD FOR FABRICATING THE SAME

(75) Inventors: Shin Nakamura, Tokyo (JP); Yoshimi Kubo, Tokyo (JP); Yuichi Shimakawa, Tokyo (JP); Takashi Manako, Tokyo (JP); Hidekazu Kimura, Tokyo (JP); Hideto Imai, Tokyo (JP); Sadanori Kuroshima, Tokyo (JP); Tsutomu Yoshitake, Tokyo (JP); Takeshi Obata, Tokyo (JP)

(73) Assignee: NEC Corporation, Tokyo (JP)

( * ) Notice: Subject to any disclaimer, the term of this patent is extended or adjusted under 35 U.S.C. 154(b) by 1507 days.

(21) Appl. No.: 10/971,737

(22) Filed: Oct. 18, 2004

(65) Prior Publication Data

US 2005/0112448 A1 May 26, 2005

Related U.S. Application Data

(63) Continuation of application No. PCT/JP03/04819, filed on Apr. 16, 2003.

(30) Foreign Application Priority Data

Apr. 17, 2002 (JP) ............................. 2002-114339

(51) Int. Cl.
*H01M 4/86* (2006.01)
*H01M 4/88* (2006.01)

(52) U.S. Cl. ............................. 429/33; 429/42; 502/101

(58) Field of Classification Search ........................ None
See application file for complete search history.

(56) References Cited

U.S. PATENT DOCUMENTS 6,277,513 B1    8/2001   Swathirajan et al.

6,933,068 B2 *  8/2005   Asano et al. ................... 429/33

FOREIGN PATENT DOCUMENTS

| EP | 1 045 467 | 8/2003 |
|----|-----------|--------|
| JP | 07-135004 | 5/1995 |
| JP | 8-148151  | 6/1996 |
| JP | 11-135136 | 5/1999 |
| JP | 11-144745 | 5/1999 |
| JP | 11-288727 | 10/1999 |

(Continued)

OTHER PUBLICATIONS

Chinese Office Action dated Feb. 10, 2006, from corresponding Chinese Application No. 03807331.5, with partial translation.

(Continued)

*Primary Examiner*—John S Maples
(74) *Attorney, Agent, or Firm*—Katten Muchin Rosenman LLP

(57) ABSTRACT

An adhesion layer containing a second solid polymer electrolyte is disposed between a solid polymer electrolyte membrane and a fuel electrode and/or an oxidant electrode containing a first solid polymer electrolyte and a catalyst substance. The solid polymer electrolyte membrane and the adhesion layer are made of the same solid polymer electrolyte. In this manner, the adhesion at the interface between the electrode surface and the solid polymer electrolyte membrane is enhanced to implement the elevation of the cell characteristics and the elevation of the reliability of the cell.

18 Claims, 7 Drawing Sheets

FOREIGN PATENT DOCUMENTS

| | | | |
|---|---|---|---|
| JP | 11288727 | * | 10/1999 |
| JP | 2000-311694 | | 11/2000 |
| JP | 2002-8440 | | 1/2002 |
| JP | 2002-15743 | | 1/2002 |
| JP | 2002-298867 | | 10/2002 |
| JP | 2002-373674 | | 12/2002 |
| WO | WO 02/082572 | | 10/2002 |
| WO | WO 02/101860 | | 12/2002 |

OTHER PUBLICATIONS

International Search Report dated Aug. 12, 2003.
International Preliminary Examination Report dated Nov. 18, 2004.

* cited by examiner

FUEL CELL, FUEL CELL ELECTRODE AND METHOD FOR FABRICATING THE SAME

CROSS-REFERENCE TO RELATED APPLICATION

The present application is a continuation of International Application No. PCT/JP2003/004819 which was filed on Apr. 16, 2003, which is herein incorporated by reference.

TECHNICAL FIELD

The present invention relates to a fuel cell, a fuel cell electrode and a method for fabricating the same.

BACKGROUND ART

A solid polymer fuel cell is a power-generating apparatus wherein hydrogen and oxygen are supplied to the fuel electrode and the oxidant electrode, respectively. The fuel electrode and the oxidant electrode are bonded to the respective surfaces of a solid polymer electrolyte membrane containing perfluorosulfonic acid acting as an electrolyte.

The following reactions take place in the respective electrodes.

Fuel Electrode: $H_2$ 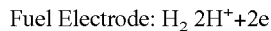 $2H^+ + 2e$

Oxidant Electrode: 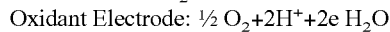 $\frac{1}{2} O_2 + 2H^+ + 2e$ $H_2O$

Higher power of 1 A/cm² or more can be obtained at ambient temperatures and atmospheric pressure in accordance with the reactions in the solid polymer fuel cell.

In the fuel electrode and the oxidant electrode, mixtures consisting of carbon particles supporting catalyst metal and a solid polymer electrolyte are present. Generally, these mixtures are applied on the electrode substrates such as carbon paper acting as layers for diffusing fuel gas. These two electrodes sandwiching therebetween the solid polymer electrolyte membrane are thermally bonded under pressure to configure the fuel cell.

In the fuel cell thus configured, hydrogen gas supplied to the fuel electrode reaches to the catalyst after passing through fine pores in the electrode to be converted into the hydrogen ions by releasing the electrons. The released electrons are introduced to an external circuit after passing through the carbon particles and the solid polymer electrolyte, and flow into the oxidant electrode through the external circuit.

On the other hand, the hydrogen ions generated on the fuel electrode reach the oxidant electrode through the solid polymer electrolyte in the fuel electrode and the solid polymer electrolyte membrane sandwiched between both the electrodes, and then form water by means of the reaction with oxygen supplied to the oxidant electrode and the electrons flowing from the external circuit in accordance with the above reaction formula. As a result, the electrons flow from the fuel electrode toward the oxidant electrode in the external circuit to provide electric power.

In order to improve the characteristics of the fuel cell having the above configuration, a larger adhesive force is important at the interfaces between the electrodes and the solid polymer electrolyte membrane. That is, a higher ionic conductivity of the hydrogen ions generated through the electrode reaction is desired at the interfaces between them. A poor adhesion on the interface increases the electric resistance due to the decrease of the conductivity of the hydrogen ions and results in a reduction of the cell efficiency.

While the fuel cell using the hydrogen as the fuel has been described heretofore, the research and the development regarding a fuel cell using an organic liquid fuel such as methanol have been extensively conducted in recent years.

In the fuel cell using the organic liquid fuel, it is known that the organic liquid fuel is modified to the hydrogen gas for use, or the organic liquid fuel is directly supplied to the fuel electrode as represented by the direct-methanol type fuel cell.

In the fuel cell in which the organic liquid fuel is directly supplied to the fuel electrode, no apparatus such as a reformer is required because the organic liquid fuel is directly supplied to the fuel electrode. Accordingly, the cell structure can be made simpler and the entire apparatus can be advantageously made downsized. Further, the organic liquid fuel has an advantage of being more easily and safely transported than the gas fuel such as the hydrogen gas and hydrocarbon gas.

Generally, in the fuel cell using the organic liquid fuel, the solid polymer electrolyte membrane made of solid polymer ion exchange resin is used as the electrolyte. In order to operate the fuel cell, the hydrogen ion is required to move from the fuel electrode to the oxidant electrode through the above membrane, and the movement of the hydrogen ion is accompanied with the movement of water. Accordingly, the membrane is required to contain a certain amount of moisture.

However, in case of using the organic liquid fuel having the higher hydrophilicity to water such as methanol, a problem to be overcome arises that organic liquid fuel diffuses in the solid polymer electrolyte membrane containing the moisture to further reach to the oxidant electrode (crossover). The crossover brings about the reductions of the voltage, the output and the fuel efficiency because the organic liquid fuel which should essentially supply electrons to the fuel electrode is oxidized on the oxidant electrode so that the organic liquid fuel is not effectively used as the fuel.

In view of overcoming the problem of the crossover, the suitable selection of polymer having lower water content as the material of the solid polymer electrolyte membrane is desirable for suppressing the diffusion of the organic liquid fuel such as the methanol with the water. However, in connection with the catalyst layer on the surface of the electrode which is adjacent to the above electrolyte membrane, it is important to supply a plenty of the hydrogen ions thereto by efficiently moving, from the electrode layer, the organic fuel cell to be used as the fuel. That is, it is desirable that the catalyst layer on the electrode surface allows the organic liquid fuel to better permeate and electrolyte membrane does not allow the organic liquid fuel to permeate. In order to achieve these, it is suitable that a material having a higher water content and a higher permeability regarding the organic liquid fuel is used as the polymer forming the catalyst layer on the electrode surface, and a material having a lower water content and lower permeability regarding the organic liquid fuel is used as the polymer which forms the solid polymer electrolyte membrane.

JP-A-2001-167775 describes a technique regarding a membrane having ionic conductivity in which the crossover of methanol can be suppressed while maintaining the ionic conductivity. In the publication, the surface layer of the ionic conductive membrane having fluorine resin as its main structure, such as Nafion (registered trademark) is modified by the electron beam radiation such that the conductivity of the surface layer is lower than the interior of the membrane.

However, when the materials of the catalyst layer of the electrode surface and the solid polymer electrolyte membrane are different from each other, the sufficient adhesion cannot be obtained and thereby the peel-off may take place at the interface between the electrode surface and the solid polymer electrolyte membrane. The peel-off increases the electric resistance on the interface and cause the reduction of the reliability regarding the cell performance. The modification of the surface layer of the ionic conductive membrane as described in the above JP-A-2001-167775 also has a problem that the surface strength increase at the time of swelling of the ionic conductive membrane worsens the adhesion with the catalyst layer of the electrode surface. In view of these circumstances, an object of the present invention is to increase the adhesion at an interface between an electrode surface and a solid polymer electrolyte membrane, thereby improving cell performances and reliability of a cell.

Another object of the present invention is to suppress crossover of an organic liquid fuel while maintaining excellent hydrogen ion conductivity on the electrode surface and permeability of the organic liquid fuel.

DISCLOSURE OF INVENTION

The solid polymer electrolyte having higher hydrogen ion conductivity and represented by Nafion (registered trademark) is generally used as the solid polymer electrolyte membrane of the fuel cell. The higher hydrogen ion conductivity of such a solid polymer electrolyte is developed by the polymer electrolyte containing plenty of water. On the other hand, the plenty of the moisture contained therein accelerates generation of the crossover due to the easy dissolution of the organic liquid fuel such as methanol into the water.

Then, in order to intend the suppression of the crossover, the present inventors have fabricated a direct methanol type fuel cell by using, as a solid polymer electrolyte configuring a fuel electrode, an oxidant electrode and a solid polymer electrolyte membrane, a polymer material having lower permeability regarding the organic liquid fuel than that of Nafion, and have evaluated the fuel cell. However, the cell performances of the above fuel cell were lower than those of the conventional cell using the Nafion. This is probably due to the reductions of the permeability of the methanol and of the hydrogen ion conductivity in the fuel electrode. The fuel electrode of the above fuel cell has a catalyst layer containing carbon particles which support a catalyst, and solid polymer electrolyte acting as a binder in a mixed configuration, and the solid polymer electrolyte exists among the catalysts. Accordingly, in order to attain the smooth movements of the methanol, the hydrogen and the electrons, the solid polymer electrolyte which acts as a transmission path is required to have the higher permeability regarding the organic liquid fuel such as methanol and the excellent hydrogen ion conductivity. The excellent cell characteristics could not be obtained probably because the solid polymer electrolyte did not sufficiently satisfy these performances in the cell having the above structure.

Then, in order to make efficient the catalyst reaction on the fuel electrode, the present inventors have attempted the fabrication of the direct methanol type fuel cell by using, as the solid polymer electrolyte on the electrode surface, the Nafion, and using, as the solid polymer electrolyte membrane, the polymer material having the lower permeability regarding the organic liquid fuel than that of Nafion. However, the fuel electrode and the solid polymer electrolyte membrane were insufficiently bonded with each other, and the cell worth evaluating could not be obtained.

In accordance with the further investigations based on the results of these preliminary experiments, the present inventors have reached to the present invention based on the finding that the adhesion at the interface between the electrode surface and the solid polymer electrolyte membrane can be efficiently increased by effectively utilizing a plurality of solid polymer electrolytes.

In accordance with the present invention, a fuel cell is provided including a catalyst electrode containing a first solid polymer electrolyte and a catalyst substance; a solid polymer electrolyte membrane; and an adhesion layer containing a second solid polymer electrolyte and sandwiched between the catalyst electrode and the solid polymer electrolyte membrane.

Herein, the adhesion layer and the solid polymer electrolyte membrane may be in contact with each other or may be separated from each other. The configuration in which the both are in contact with each other can definitely increase the adhesion at the interface between the adhesion layer and the solid polymer electrolyte membrane.

The adhesion layer and the catalyst electrode may be in contact with each other or may be separated from each other. The configuration in which the both are in contact with each other can definitely increase the adhesion at the interface between the adhesion layer and the catalyst electrode.

The "catalyst electrode" in the present invention refers to an electrode containing a catalyst, and used as a generic term including the fuel electrode and the oxidant electrode. The first solid polymer electrolyte on the catalyst electrode surface has a role of electrically connecting the carbon particles supporting the catalyst with the solid polymer electrolyte membrane as well as of reaching the organic liquid fuel to the catalyst surface, and is required to have the hydrogen ion conductivity and the water mobility. Further, the permeability regarding the organic liquid fuel such as methanol is required in the fuel electrode, and the oxygen permeability is required in the oxidant electrode. As the first solid polymer electrolyte satisfying these requirements, the material excellent in the hydrogen ion conductivity and the permeability regarding the organic liquid fuel such as methanol is preferably used as the first solid polymer electrolyte.

On the other hand, the solid polymer electrolyte membrane has a role of separating the fuel electrode from the oxidant electrode in addition to moving the hydrogen ions between them, and preferably has a function of preventing moving the liquid fuel from the fuel electrode toward the oxidant electrode, namely the crossover of the organic liquid fuel.

As described, the fuel electrode, the oxidant electrode and the solid polymer electrolyte membrane are desirably made of different materials because the necessary properties are different from one another. However, securing the sufficient adhesion at the interface between the different materials is generally difficult. Then, in the present invention, the adhesion layer between the catalyst electrode and the solid polymer electrolyte membrane can make the adhesion between them sufficiently high even when the suitable materials for the electrode and the solid polymer electrolyte membrane are selected.

That is, in the catalyst electrode of the present invention, the electrode surface contains the first solid polymer electrolyte and the adhesion layer contains the second solid polymer electrolyte. The first solid polymer electrolyte secures the smooth movement of the hydrogen ion and the liquid fuel on the electrode surface and the second solid polymer electrolyte strongly adheres the catalyst electrode and the solid polymer electrolyte membrane at the interface between them. In accordance with the present invention having the configuration, the excellent cell efficiency can be stably realized for a longer period of time while suppressing the increase of the electric resistance at the interface between the catalyst electrode and the solid polymer electrolyte membrane.

The adhesion layer of the present invention is not necessarily formed on the entire surface between the solid polymer electrolyte membrane and the catalyst electrode, and may be formed on at least part of the surface between them. The adhesion layer may contain the first solid polymer electrolyte. In this case, the content of the first solid polymer electrolyte in the adhesion layer may have distribution in the direction from the catalyst electrode toward the solid polymer electrolyte membrane. For example, the adhesion layer may contain the first solid polymer electrolyte on one side in contact with the catalyst electrode and may contain no first solid polymer electrolyte on the other side in contact with the solid polymer electrolyte membrane. Simultaneously, in this case, the adhesion layer may contain no second solid polymer electrolyte on one side in contact with the catalyst electrode and may contain the second solid polymer electrolyte on the other side in contact with the solid polymer electrolyte membrane. In this configuration, the respective adhesions between the adhesion layer and the catalyst electrode and between the adhesion layer and the solid polymer electrolyte membrane can be increased.

Further, the adhesion layer may contain the catalyst substance. In this case, the content of the catalyst substance in the adhesion layer may have distribution in the direction from the catalyst electrode toward the solid polymer electrolyte membrane. For example, the adhesion layer may contain the catalyst substance on one side in contact with the catalyst electrode and may contain no catalyst substance on the other side in contact with the solid polymer electrolyte membrane. The electron conductivity of the adhesion layer can be made excellent by the configuration in which the adhesion layer contains the catalyst substance.

The second solid polymer electrolyte may have the higher adhesion to the solid polymer electrolyte membrane than the first solid polymer electrolyte may have. The second solid polymer electrolyte may contain the solid polymer electrolyte configuring the solid polymer electrolyte membrane or its derivative. In this configuration, the excellent adhesion is developed between the first solid polymer electrolyte and the solid polymer electrolyte membrane through the second solid polymer electrolyte configuring the adhesion layer.

The fuel cell of the present invention may have a configuration in which organic liquid fuel may be supplied to the catalyst electrode. This refers to a so-called direct type fuel cell. For example, methanol can be used as the organic liquid fuel. The direct type fuel cell has advantages of providing the higher cell efficiency and of requiring a smaller space because of the non-necessity of the reformer. On the other hand, the crossover of the organic liquid fuel such as methanol is problematical. In accordance with the present invention, the excellent cell efficiency can be realized for a longer period of time by suppressing the increase of the electric resistance at the interface between the catalyst electrode and the solid polymer electrolyte membrane while overcoming the problem of the crossover.

In accordance with the present invention, a fuel cell electrode is also provided including an electrode layer containing a catalyst substance and a first solid polymer electrolyte; and an adhesion layer containing a second solid polymer electrolyte formed on the electrode layer.

In accordance with the present invention, the catalyst electrode and the solid polymer electrolyte membrane can be strongly bonded by means of the second solid polymer electrolyte while making excellent the hydrogen ion conductivity and the liquid fuel permeability on the catalyst electrode surface by means of the first solid polymer electrolyte. Solid electrolyte configuring the electrode surface must simultaneously satisfy the electrode performances and the interface adhesion in the conventional catalyst electrode. However, because of the existence of the adhesion layer, the first solid polymer electrolyte may take a role of making the electrode performances excellent and the second solid polymer electrolyte may take a role of making the interface adhesion excellent in the present invention. Accordingly, the compatibility between the electrode performances and the interface adhesion, which is hardly realizable by using the single solid polymer electrolyte, can be stably realized.

Further, in accordance with the present invention, a method of fabricating a fuel cell electrode including a catalyst layer and an adhesion layer sequentially formed on a substrate is provided including the steps of; forming the catalyst layer by applying a first application liquid containing electro-conductive particles supporting catalyst metal and particles having a first solid polymer electrolyte on the substrate; and forming the adhesion layer by applying a second application liquid containing particles having a second solid polymer electrolyte which contains polymer which is different from the first solid polymer electrolyte on the catalyst layer.

In accordance with the fabrication method, after the first application liquid containing the particles having the first solid polymer electrolyte is applied on the substrate to form the catalyst layer, the second application liquid containing the particles having the second solid polymer electrolyte made of the polymer which is different from the first solid polymer electrolyte is applied on the catalyst layer to form the adhesion layer. Accordingly, the layer of the particles containing the second solid polymer electrolyte is formed on the layer of the particles containing the first solid polymer electrolyte, and the excellent adhesion is developed between the both solid polymer electrolytes. Although the reason of obtaining the excellent adhesion by employing the above method is not necessarily apparent, it is supposed that the moderate concave-convex is generated on the surface of the catalyst layer made of the particles to increase a contact area with the particles of the adhesion layer, thereby easily generating the adsorption or the bonding. The adhesion between the adhesion layer and the solid polymer electrolyte membrane can be made more excellent by a configuration in which the solid polymer electrolyte membrane contains the second solid polymer electrolyte.

The above application liquid may have a configuration in which the particles containing the first solid polymer electrolyte or the particles containing the second solid polymer electrolyte are dispersed in the application liquid. In this manner, the workability and the manufacture stability during the application can be made excellent.

Further, in accordance with the present invention, a method of fabricating a fuel cell is provided in which, after obtaining the fuel cell electrode in accordance with the above method, a fuel cell electrode and a solid polymer electrolyte membrane are thermally bonded under pressure in a state in which an adhesion layer and the solid polymer electrolyte membrane are in contact with each other.

In accordance with this fabrication method, the adhesion layer can be stably formed in a simpler step, and the fuel cell having the excellent adhesion between the catalyst electrode and the solid polymer electrolyte membrane can be stably obtained.

In accordance with the present invention, a method of fabricating a fuel cell including a solid polymer electrolyte membrane and a pair of electrodes sandwiching the solid polymer electrolyte membrane and fabricated by forming a catalyst layer on a substrate can be provided including the steps of; forming the catalyst layer by applying a first application liquid containing a catalyst substance and particles having a first solid polymer electrolyte on the substrate; forming an adhesion layer by applying a second application liquid containing particles having a second solid polymer electrolyte which is different from the first solid polymer electrolyte on the solid polymer electrolyte membrane; and thermally bonding the electrode and the solid polymer electrolyte membrane under pressure in a state in which the catalyst layer and the solid polymer electrolyte membrane are in contact with each other.

In the present invention, the permeability with respect to the organic liquid fuel of the second solid polymer electrolyte is preferably lower than that of the first solid polymer electrolyte. In this manner, the adhesion with the solid polymer electrolyte membrane can be obtained while the organic liquid fuel permeability and the hydrogen ion conductivity in the catalyst electrode are secured. In order to realize this concept, the following configurations are preferable.

(i) The water content of the second solid polymer electrolyte is lower than that of the first solid polymer electrolyte.

(ii) Both of the first solid polymer electrolyte and the second solid polymer electrolyte contains protonic acid group, and the protonic acid group containing-density of the second solid polymer electrolyte is lower than that of the first solid polymer electrolyte. The protonic acid group used herein refers to one or more polar groups selected from the group consisting of sulfone group, carboxyl group, phosphoric acid group, phosphonate group, phosphinic acid group.

In the present invention, the first solid polymer electrolyte may contain fluorine-containing polymer. In the present invention, the second solid polymer electrolyte may contain fluorine-free polymer. Further, in the present invention, the second solid polymer electrolyte may be made of polymer containing aromatic group.

The measurement of the resin content and the catalyst content in the present invention can be conducted by means of secondary ion mass spectrometry (SIMS) while the sputtering is conducted to the surface of the layered structure to be measured.

As described above, the adhesion layer disposed between the catalyst electrode and the solid polymer electrolyte membrane can provide the excellent adhesion between the solid polymer electrolyte membrane and the above electrode in the present invention. Accordingly, the adhesion on the interface between the electrode surface and the solid polymer electrolyte membrane is increased to improve the cell characteristics and the cell reliability. Further, the crossover of the organic liquid fuel can be suppressed while the hydrogen ion conductivity on the electrode surface and the permeability of the organic liquid fuel can be maintained excellent.

The above and other objects, features and advantages of the present invention will be more apparent from the following description.

BEST MODE FOR IMPLEMENTING INVENTION

In the fuel cell of the present invention, an adhesion layer containing a second solid polymer electrolyte is formed between a catalyst electrode containing a first solid polymer electrolyte and a catalyst substance, and a solid polymer electrolyte membrane. Depending on fabrication processes, the adhesion layer may be bonded to the catalyst electrode and the solid polymer electrolyte membrane after the adhesion layer is formed on the catalyst electrode or the solid polymer electrolyte membrane; or may be thermally bonded under pressure after the adhesion layer in the form of a sheet is disposed between the catalyst electrode and the solid polymer electrolyte membrane.

The catalyst electrode of the present invention contains the catalyst substance and the first solid polymer electrolyte. A specific example is a configuration in which the catalyst layer containing the catalyst substance and the first solid polymer electrolyte is formed on a substrate such as carbon paper. The catalyst substance includes catalyst metal and conductive particles supporting the catalyst metal. Carbon particles are used as the electro-conductive particles. The first solid polymer electrolyte has a role of electrically connecting the electro-conductive particles and the solid polymer electrolyte membrane as well as fixing the conductive particles on the substrate.

The adhesion layer of the present invention contains the second solid polymer electrolyte. The catalyst metal and the electro-conductive particles such as carbon particles supporting the catalyst metal other than the second solid polymer electrolyte can be also contained. The catalyst metal and the conductive particles contained in the adhesion layer consume the organic liquid fuel in the adhesion layer to take place the electrode reaction, thereby making the electron conductivity of the adhesion layer excellent. The adhesion layer of the present invention may contain other solid polymer electrolyte than the first solid polymer electrolyte and the second solid polymer electrolyte.

EMBODIMENT

First to third Embodiments of the present invention will be hereinafter described in detail.

First Embodiment

Figure 1:
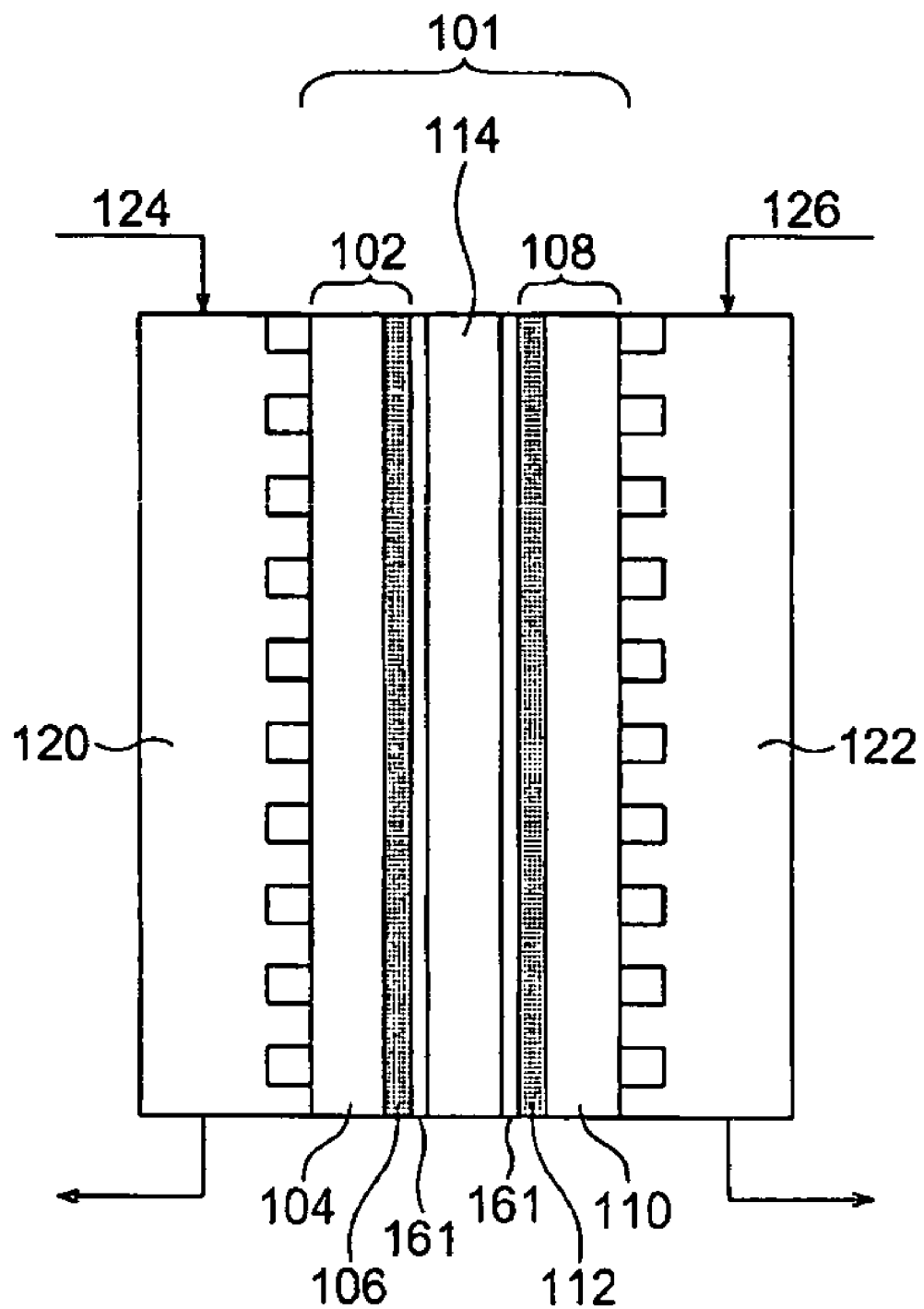
FIG. 1 is a sectional view schematically showing one example of a fuel cell in accordance with the present invention.

As shown in FIG. 1, in a fuel cell of the present Embodiment, a membrane electrode assembly 101 is configured by a fuel electrode 102, an oxidant electrode 108 and a solid polymer electrolyte membrane 114. The fuel electrode 102 is configured by a substrate 104 and a catalyst layer 106. The oxidant electrode 108 is configured by a substrate 110 and a catalyst layer 112. Respective adhesion layers 161 are disposed between the solid polymer electrolyte membrane 114 and the fuel electrode 102 and between the solid polymer electrolyte membrane 114 and the oxidant electrode 108. A plurality of the membrane electrode assemblies 101 are electrically connected among one another through fuel electrode-side separators 120 and oxidant electrode-side separators 122, thereby fabricating the fuel cell 100.

The fuel electrode 102 and the oxidant electrode 108 have configurations including the catalyst layer 106 and the catalyst layer 112, respectively, each containing the catalyst and the first solid polymer electrolyte. The solid polymer electrolyte membrane 114 is made of the second solid polymer electrolyte. The adhesion layer 161 contains the second solid polymer electrolyte. The specific materials for forming the first and the second solid polymer electrolytes will be described later.

In the fuel cell 100 having the above configuration, fuel 124 is supplied to the fuel electrodes 102 of the respective membrane electrode assemblies 101 through the fuel electrode-side separators 120. An oxidant 126 such as air or oxygen is supplied to the oxidant electrodes 108 of the respective membrane electrode assemblies 101 through the oxidant electrode-side separators 122.

The solid polymer electrolyte membrane 114 has a role of separating the fuel electrode 102 and the oxidant electrode 108 as well as of moving hydrogen ion and water molecules between the both electrodes. Therefore, the solid polymer electrolyte membrane 114 preferably has higher hydrogen ion conductivity, and preferably has the chemical stability and the higher mechanical strength. As the materials configuring the solid polymer electrolyte membrane 114, organic polymers having a polar group including a strong acid group such as sulfone group, phosphoric acid group, phosphonate group and phosphine group; and a weak acid group such as carboxyl group are preferably used. As such the organic polymers, aromatic ring-containing polymers such as sulfonated poly(4-phenoxybenzoyl-1,4-phenylene) and alkylsulfonated polybenzoimidazole; copolymers such as polystyrenesulfonic acid copolymer, polyvinylsulfonic acid copolymer, bridged alkylsulfonic acid derivative and fluorine-containing polymer containing fluorine resin skeleton and sulfonic acid; copolymers prepared by co-polymerizing acryl amide such as acrylamide-2-methylpropan sulfonic acid and acrylate such as n-butylmethacrylate; sulfonic group-containing perfluorocarbon (Nafion (registered trademark, available from Du Pont), Aciplex (available from Asahi Kasei Corporation)); carboxyl group-containing perfluorocarbon (Flemion (registered trademark) S membrane, (available from Asahi Glass Co., Ltd.)) can be exemplified. The selection of the aromatic ring-containing polymers such as sulfonated poly(4-phenoxybenzoyl-1,4-phenylene) and alkylsulfonated polybenzoimidazole can suppress the permeation of the organic liquid fuel, thereby suppressing the reduction of the cell efficiency due to the crossover.

A bridgeable substituent such as vinyl group, epoxy group, acryl group, methacryl group, cinnamoyl group, methylol group, azide group and naphthoquinone-diazide group is suitably introduced to the above polymers, and these polymers in their molten states may be radiated with radiation rays to be bridged.

Figure 2:
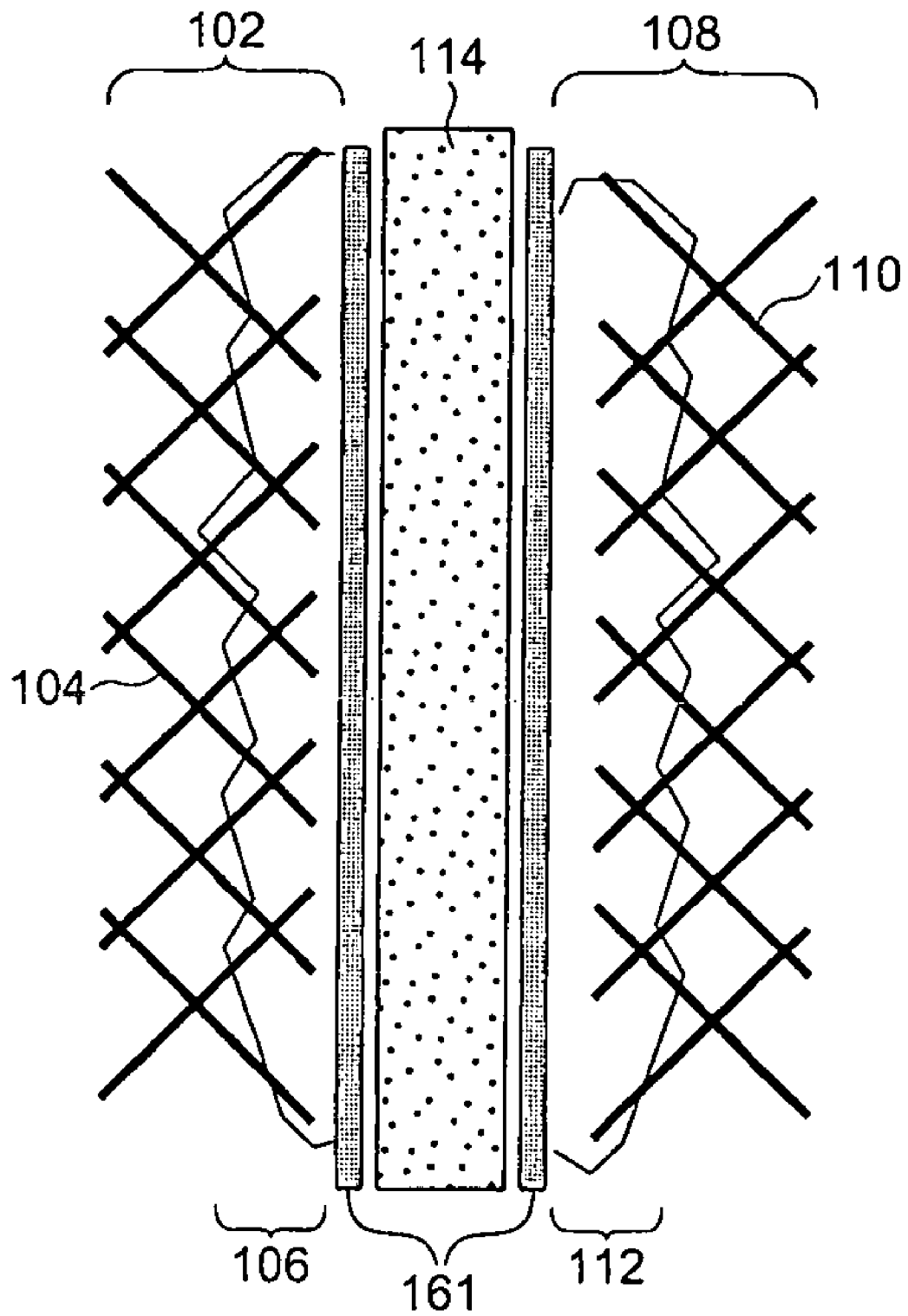
FIG. 2 is a sectional view schematically showing a fuel electrode, an oxidant electrode and a solid polymer electrolyte in one example of a fuel cell of the present invention.

FIG. 2 is a sectional view schematically showing the structure of the fuel electrode 102, the oxidant electrode 108, the solid polymer electrolyte membrane 114 and the adhesion layer 161. As shown therein, the fuel electrode 102 and the oxidant electrode 108 of the present Embodiment are configured by forming the catalyst layer 106 and the catalyst layer 112 which are films containing carbon particles supporting a catalyst and solid polymer electrolyte fine particles on the substrate 104 and the substrate 110, respectively. The substrate surface may be hydrophobically treated.

A porous substrate such as carbon paper, molded carbon, sintered carbon, sintered metal and foamed metal can be used as the substrate 104 and the substrate 110. A water repellent agent such as polytetrafluoroethylene can be used for the hydrophobic treatment of the substrate.

Platinum, alloys such as platinum with ruthenium, gold or rhenium; rhodium, palladium, iridium, osmium, ruthenium, rhenium, gold, silver, nickel, cobalt, lithium, ranthanum, strontium and yttrium can be exemplified as the catalyst of the fuel electrode 102. On the other hand, the catalyst of the fuel electrode 102 can be also used as the catalyst of the oxidant electrode 108, and the same catalysts can be exemplified. The catalysts of the fuel electrode 102 and the oxidant electrode 108 may be the same or different from each other.

As the carbon particles supporting the catalyst, acetylene black (Denka Black (registered trademark, available from Denki Kagaku Kogyo K.K.), XC72 (available from Vulcan Corporation), ketjen black, carbon nanotube and carbon nanohorn can be exemplified. The particle size of the carbon particles is, for example, 0.001 to 0.1 m, and preferably 0.02 to 0.06 m.

The solid polymer electrolyte configuring the fuel electrode 102 or the oxidant electrode 108 contains at least the first solid polymer electrolyte. The solid polymer electrolyte configuring the fuel electrode 102 or the oxidant electrode 108 may contain the second solid polymer electrolyte. Both of the fuel electrode 102 and the oxidant electrode 108 may contain the first and the second solid polymer electrolytes, or either of the fuel electrode 102 and the oxidant electrode 108 may contain the first and the second solid polymer electrolytes.

The first solid polymer electrolyte configuring the fuel electrode 102 and the oxidant electrode 108 has a role of electrically connecting the carbon particles supporting the catalyst and the solid polymer electrolyte membrane 114 on the electrode surface, is required to be excellent in the hydrogen ion conductivity and the water mobility, is required to have permeability regarding the organic liquid fuel such as methanol in the fuel electrode 102, and is required to have the oxygen permeability in the oxidant electrode 108. The first solid polymer electrolyte satisfies these requirements, and a material excellent in hydrogen ion conductivity and permeability regarding organic liquid fuel such as methanol is preferably used, Specifically, the organic polymers having a polar group including a strong acid group such as sulfone group and phosphoric acid group; and a weak acid group such as carboxyl group are preferably used. As such the organic polymers, sulfone group-containing perfluorocarbon (Nafion (registered trademark, available from Du Pont), Aciplex available from Asahi Kasei Corporation)); carboxyl group-containing perfluorocarbon (Flemion (registered trademark) S membrane (available from Asahi Glass Co., Ltd.)); copolymers such as polystyrenesulfonic acid copolymer, polyvinylsulfonic acid copolymer, bridged alkylsulfonic acid derivative and fluorine-containing polymer made of fluorine resin skeleton and sulfonic acid; copolymers prepared by co-polymerizing acryl amide such as acryl amide-2-methylpropan sulfonic acid and acrylate such as n-butylmethacrylate can be exemplified. As the polymers to which a polar group is bonded, resin having nitrogen or a hydroxyl group such as polybenzimidazole derivative, polybenzoxazole derivative, polyethyleneimine derivative, polycylamine derivative, amine-substituted polystyrene such as polydiethyl-aminoethylpolystyrene, and nitrogen-substituted polyacrylate such as diethylaminoethylpolymethacrylate; hydroxyl group-containing polyacryl resin represented by silanol-containing polysiloxane and hydroxyethylpolymethyl-acrylate; and hydroxyl group-containing polystyrene resin represented by parahydroxypolystyrene can be exemplified. In view of the ionic conductivity, among these, the sulfonic group-containing perfluorocarbon (Nafion (registered trademark, available from Du Pont), Aciplex (available from Asahi Kasei Corporation)); and the carboxyl group-containing perfluorocarbon (Flemion (registered trademark) S membrane (available from Asahi Glass Co., Ltd.)) are preferably used.

A bridgeable substituent such as vinyl group, epoxy group, acryl group, methacryl group, cinnamoyl group, methylol group, azide group and naphthoquinone-diazide group is suitably introduced to the above polymers.

The second solid polymer electrolyte configuring the adhesion layer 161 in FIG. 1 has a role of improving the adhesion between the electrode surface and the solid polymer electrolyte membrane 114, and the material having the excellent adhesion to the solid polymer electrolyte membrane 114 is preferably used. When, for example, the solid polymer electrolyte membrane 114 is made of organic polymer, the selection of polymer having a similar structure to that of the above organic polymer or polymer having the physical property values such as polarity, wettability and an SP value similar to those of the above organic polymer as the second solid polymer electrolyte can improve the adhesion between the electrode and the solid polymer electrolyte membrane 114. When, for example, the solid polymer electrolyte membrane 114 is made of fluorine-free polymer, fluorine-free polymer is preferably selected as the second solid polymer electrolyte. When aromatic group-based polymer is used as the solid polymer electrolyte membrane, aromatic group-based polymer is preferably selected as the second solid polymer electrolyte. The adhesion layer 161 may be bridged by radiating the radiation rays to the polymer in the molten state after a bridgeable substituent is introduced.

In view of suppressing the crossover, both of the solid polymer electrolyte membrane 114 and the second solid polymer electrolyte are preferably made of the material having the lower permeability regarding the organic liquid fuel. For example, they are preferably made of aromatic ring-containing polymers such as sulfonated poly(4-phenoxybenzoyl-1, 4-phenylene) and alkylsulfonated polybenzoimidazole. The solid polymer electrolyte membrane 114 and the second solid polymer electrolyte preferably have a degree of swelling by methanol of, for example, 50% or less, desirably 20% or less (degree of swelling against 70% in volume of MeOH aqueous solution). Thereby, the especially excellent interface adhesion and proton conductivity can be obtained.

The first solid polymer electrolyte in the fuel electrode 102 and the oxidant electrode 108 may be the same or different from each other).

The liquid organic fuel or hydrogen-containing gas may be used as the fuel of the fuel cell in accordance with the present Embodiment. When the liquid organic fuel is used, the effects of the invention can be remarkably demonstrated because the cell efficiency is improved while the crossover of the liquid fuel is suppressed.

While a method of fabricating the membrane electrode assembly of the present Embodiment is not especially restricted, the assembly may be fabricated as follows.

At first, catalyst is supported on carbon particles. This process can be conducted by the generally-used impregnation method. Then, the fuel electrode 102 and the oxidant electrode 108 formed with the catalyst layer 106 and the catalyst layer 112, respectively, can be fabricated by dispersing the carbon particles supporting the catalyst and the first solid polymer electrolyte into a solvent to make a paste and applying the paste on the substrates followed by drying. The particle size of the carbon particles is adjusted to be, for example, 0.001 to 0.1 m. The particle size of the catalyst particles is adjusted to be, for example, 0.1 nm to 100 nm. The particle sizes of the first and the second solid polymer electrolytes are, for example, 0.05 to 100 m. The carbon particles and the solid polymer electrolyte particles are used, for example, in a weight ratio from 1:5 to 40:1. The weight ratio between the water and the dissolved substance in the paste is adjusted to be, for example, from 1:2 to 10:1. While a method of applying the paste on the substrate is not especially restricted, brush application, spray application and screen printing can be used, for example. The paste is applied with thickness of about 1 m to 2 mm. After the application of the paste, it is dried at a heating temperature for a specified length of heating depending on the first solid polymer electrolyte used. While the heating temperature and the specified length of heating are suitably selected depending on the material used, the heating temperature is 100 to 250, and the specified length of heating is 30 seconds to 30 minutes, for example.

The solid polymer electrolyte membrane 114 of the present invention can be fabricated by using a method suitable for material used. For example, it is obtained by casting liquid prepared by dissolving or dispersing an organic polymer material into a solvent on an exfoliation sheet made of polytetrafluoroethylene followed by drying.

Then, the adhesion layer 161 is formed. The adhesion layer 161 can be formed by applying an application liquid having dissolved or dispersed second solid polymer electrolyte on the catalyst layer 106 or the catalyst layer 112 and/or the surface of the solid polymer electrolyte membrane 114 followed by drying. When the application liquid is applied on the solid polymer electrolyte membrane 114, the process is conducted on both of the surfaces of the solid polymer electrolyte membrane 114. In this case, for example, after the application liquid is applied on one surface of the solid polymer electrolyte membrane 114 and the surface is covered with an exfoliation sheet made of polytetrafluoroethylene, the application liquid may be applied on the other surface of the solid polymer electrolyte membrane. Thereby, the solid polymer electrolyte membrane 114 having the adhesion layers 161 on the both surfaces can be obtained.

In the present Embodiment, although the adhesion layers 161 are present in the two regions or between the solid polymer electrolyte membrane 114 and the fuel electrode 102 and between the solid polymer electrolyte membrane 114 and the oxidant electrode 108, the adhesion layer may be present in one of the two regions. The adhesion layer of the present invention is not necessarily formed on the entire surface of the region, and may be formed in at least part of the region. For example, the adhesion layer 161 may be formed in an island shape. Thickness of the adhesion layer 161 is suitably selected in a range, for example, from 0.1 m to 20 m.

The solid polymer electrolyte membrane thus fabricated is sandwiched between the fuel electrode 102 and the oxidant electrode 108 and hot-pressed to provide the membrane electrode assembly. At this time, the surfaces of the both electrodes having the catalyst thereon are disposed to oppose to the solid polymer electrolyte membrane 114 sandwiching the adhesion layers 161. The conditions of the hot-pressing are selected depending on the material, and, for example, a temperature thereof exceeds the softening temperatures and the glass transition temperatures of the first solid polymer electrolyte and the second solid polymer electrolyte. Specifically, the temperature is between 100 and 250, the pressure is between 5 and 100 kgf/cm², and the length of time is between 10 seconds and 300 seconds.

In FIG. 2, the second solid polymer electrolyte configuring the adhesion layer 161 which is common to the material of the solid polymer electrolyte membrane 114 strongly adheres the electrode and the solid polymer electrolyte membrane 114 at the interface. As a result, the deterioration of the cell performances which occurs because of the prevention of the hydrogen ion movement due to the peel-off at the interface can be suppressed. In addition, the physical strength of the electrode is increased to improve the durability.

Next, preferable embodiments of the first and the second solid polymer electrolytes of the present invention will be described.

In view of suppressing the crossover, the first and the second solid polymer electrolytes are effectively selected as follows.

(i) The material having lower methanol permeability than that of the first solid polymer electrolyte is selected as the second solid polymer electrolyte.
  (ii) The material having a lower water content than that of the first solid polymer electrolyte is selected as the second solid polymer electrolyte.
  (iii) The material having lower density in connection with the polar groups than that of the first solid polymer electrolyte is selected as the second solid polymer electrolyte.
  (iv) The material having a lower fluorine content than that of the first solid polymer electrolyte is selected as the second solid polymer electrolyte.

By employing these, the permeation of the organic liquid fuel in the solid polymer electrolyte membrane 114 can be suppressed, thereby suppressing the reduction of the cell performances due to the crossover. Methods for measuring the above physical properties (i) to (iv) will be described.

The methanol permeability can be measured as follows. A liquid vessel is separated by a membrane (membrane thickness: 50 m, area: 1 cm²) to be measured, and 50 cc of 99.5% methanol is added into one separated chamber, and 50 cc of pure water is added into the other and the vessel is sealed such that the respective liquids are not evaporated. An amount of the permeated methanol is determined by measuring the changes on time of the concentration of the methanol which permeates the membrane to be measured into the pure water with gas chromatogram. When the above configuration (i) is used, an amount of the methanol permeation per unit area and unit time of the second solid polymer electrolyte in the form of a sheet having thickness of 50 m is preferably 300 mol/cm²/h or less. The selection of such the material can suppress the arrival of the methanol to the oxidant, thereby overcoming the problem regarding the crossover.

The water content is a value represented by (B−A)/A wherein "A" refers to the weight of a tested material dried at 100 for 2 hours and "B" refers to the weight of the tested material after the material is dipped in pure water for 24 hours.

The density of the polar group can be measured by using a specified method depending on the kind of a functional group. In case of the sulfone group, after the sulfone group is converted into sulfuric ion by using, for example, the oxygen burning flask method, the sulfric acid ion can be quantitatively analyzed with ion chromatography or titration. The titration is conducted by using 0.01M of barium perchlorate to determine the point of color change from blue to purple by using carboxyarsenazo as an indicator.

The fluorine content is quantitatively analyzed by using the fluorescent X-ray analysis.

Second Embodiment

The present Embodiment is different from the first Embodiment in that the adhesion layer 161 also contains catalyst and carbon particles supporting the catalyst.

While a method of fabricating the membrane electrode assembly of the present Embodiment is not especially restricted, the assembly may be fabricated as follows.

The catalyst layer 106 or the catalyst layer 112 can be fabricated similarly to the first Embodiment. The adhesion layer 161 can be formed by applying a paste-like application liquid prepared by dispersing the second solid polymer electrolyte and carbon particles supporting the catalyst into a solvent, on the catalyst layer 106 or the catalyst layer 112 and/or the surface of the solid polymer electrolyte membrane 114 followed by drying. The carbon particles and the solid polymer electrolyte particles in the application liquid are used, for example, in a weight ratio from 1:5 to 40:1. In this manner, the adhesion layer 161 containing the carbon particles supporting the catalyst can be prepared. The content of the carbon particles supporting the catalyst in the adhesion layer 161 may have distribution in the direction from one surface in contact with the catalyst layer 106 or the catalyst layer 112 toward the other surface in contact with the solid polymer electrolyte membrane 114. For example, the carbon particles may be contained on the surfaces of the adhesion layer 161 in contact with the catalyst layer 106 or the catalyst layer 112, and no carbon particles may be contained on the surfaces of the adhesion layers 161 in contact with the solid polymer electrolyte membrane 114.

Since the carbon particles supporting the catalyst is contained also in the adhesion layer 161 in the present Embodiment, the excellent electron conductivity can be retained in the adhesion layer.

Third Embodiment

The present Embodiment is different from the first and the second Embodiments in that the adhesion layer 161 contains the first solid polymer electrolyte in addition to the second solid polymer electrolyte. In this manner, the adhesion between the adhesion layer 161 and the catalyst layer 106 or the catalyst layer 112 can be significantly improved. In this case, the weight ratio of the second solid polymer electrolyte/the first solid polymer electrolyte in the adhesion layer 161 can be adjusted preferably from 10/1 to 1/10, more preferably from 4/1 to 1/4. Also in the present Embodiment similarly to the second Embodiment, the adhesion layer 161 may contain the carbon particles supporting the catalyst.

The first and the second solid polymer electrolytes may be uniformly distributed or non-uniformly distributed in the adhesion layer 161. When the first and the second solid polymer electrolytes are non-uniformly distributed, the content of the first solid polymer electrolyte on the surfaces of the adhesion layer 161 in contact with the catalyst layer 106 or the catalyst layer 112 may be made higher than the content of the second solid polymer electrolyte on the surfaces of the adhesion layer 161 in contact with the solid polymer electrolyte membrane 114. Since the adhesion layer 161 and the catalyst layer 106 contain the first solid polymer electrolyte and the solid polymer electrolyte membrane 114 contains the second solid polymer electrolyte in the present Embodiment, the adhesion between the adhesion layer 161 and the catalyst layer 106 or the catalyst layer 112 in addition to the adhesion between the adhesion layer 161 and the solid polymer electrolyte membrane 114 can be increased. Also in the present Embodiment, the adhesion layer 161 may be bridged by radiating the polymer in the molten state after the introduction of a bridgeable substituent.

Figure 4:
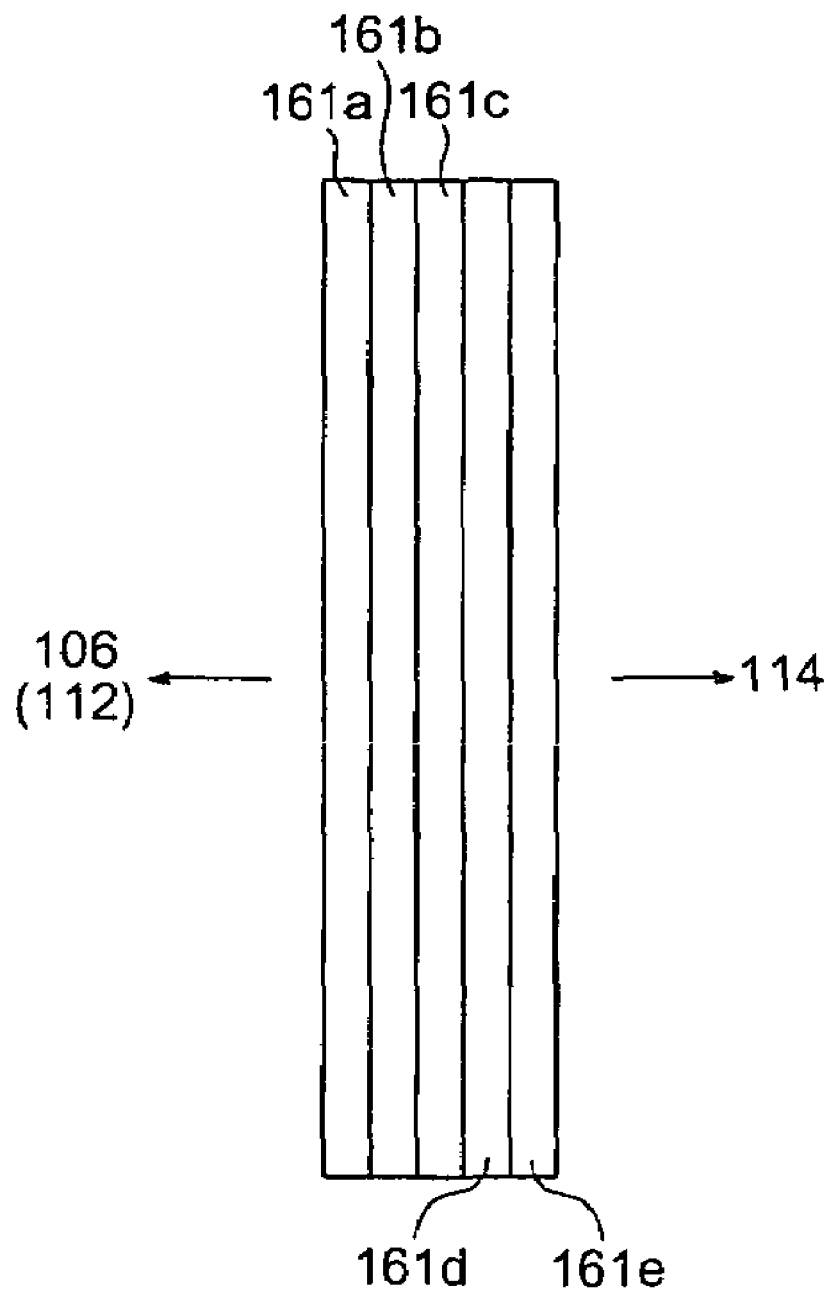
FIG. 4 is a sectional view showing in detail an adhesion layer in an embodiment of the present invention.

FIG. 4 is a sectional view showing one example of the adhesion layer 161 of the present Embodiment in detail. The adhesion layer 161 may be formed by a plurality of adhesion layers 161a, 161b, 161c, 161d and 161e. The adhesion layer 161a is a layer in contact with the catalyst layer 106 or the catalyst layer 112, and the adhesion layer 161e is a layer in contact with the solid polymer electrolyte membrane 114. In this configuration, the respective adhesion layers 161a to 161e contain both of the first solid polymer electrolyte and the second solid polymer electrolyte or at least one of them. The respective adhesion layers 161a to 161e are configured such that the content ratio of the second solid polymer electrolyte to the first solid polymer electrolyte becomes sequentially higher from the adhesion layer 161e, the adhesion layer 161d, the adhesion layer 161c, the adhesion layer 161b to the adhesion layer 161a. The adhesion layer 161a may contain no second solid polymer electrolyte, and the adhesion layer 161e may contain no first solid polymer electrolyte.

While a method of fabricating the membrane electrode assembly of the present Embodiment is not especially restricted, the assembly may be fabricated as follows.

The catalyst layer 106 or the catalyst layer 112 can be fabricated similarly to the first Embodiment. When the first and the second solid polymer electrolytes are uniformly distributed in the adhesion layer 161, a paste-like application liquid prepared by dispersing the first and the second solid polymer electrolytes in a solvent is applied on the catalyst layer 106 or the catalyst layer 112 and/or the surface of the solid polymer electrolyte membrane 114 followed by drying to form the adhesion layer 161. The carbon particles supporting the catalyst may be contained in the application liquid.

When the contents between the first solid polymer electrolyte and the second solid polymer electrolyte are made different from one another in the adhesion layer 161 which has been described referring to FIG. 4, the adhesion layer 161 can be fabricated as follows. The fabrication will be described referring to FIG. 4.

When the application liquid is applied on the solid polymer electrolyte membrane 114, the application liquid "e" containing at least the second solid polymer electrolyte particles is applied on the solid polymer electrolyte membrane 114 followed by drying to form the adhesion layer 161e. Then, the first and the second solid polymer electrolytes are dispersed in a solvent such that the content of the first solid polymer electrolyte is higher than that of the application liquid "e", and the paste-like application liquid "d" thus prepared is applied on the adhesion layer 161e followed by drying to form the adhesion layer 161d. The repetition of the application-drying processes by using the application liquids having the gradually increasing contents of the first solid polymer electrolyte can form the adhesion layer 161 in which the content of the first solid polymer electrolyte increases with the increase of the distance from the solid polymer electrolyte membrane. The membrane electrode assembly can be obtained by sandwiching the solid polymer electrolyte membrane 114 with the adhesion layer 161 thus fabricated between the fuel electrode 102 and the oxidant electrode 108 followed by the hot-pressing.

When the application liquid is applied on the catalyst layer 106 or the catalyst layer 112, the application liquid "a" containing at least the first solid polymer electrolyte particles is applied and dried on the catalyst layer 106 or the catalyst layer 112 to form the adhesion layer 161a. Then, the first and the second solid polymer electrolytes are dispersed in a solvent such that the content of the second solid polymer electrolyte is higher than that of the application liquid "a", and the paste-like application liquid "b" is applied on the adhesion layer 161a followed by drying to form the adhesion layer 161b. The repetition of the application-drying processes by using the application liquids having the gradually increasing contents of the second solid polymer electrolyte can form the adhesion layer 161 in which the content of the second solid polymer electrolyte increases with the increase of the distance from the catalyst layer 106 or the catalyst layer 112. The membrane electrode assembly can be obtained by sandwiching the solid polymer electrolyte membrane 114 with the adhesion layer 161 thus fabricated between the fuel electrode 102 and the oxidant electrode 108 followed by the hot-pressing.

The membrane electrode assembly can be obtained by sandwiching the solid polymer electrolyte membrane 114 between the fuel electrode 102 and the oxidant electrode 108 followed by the hot-pressing after the adhesion layers 161 are formed on the solid polymer electrolyte membrane and on the catalyst layer 106 or the catalyst layer 112.

The subjects to which the application liquid is applied include both or either of the solid polymer electrolyte membrane 114 or the catalyst layer 106 or the catalyst layer 112. When the application liquid contains the first and the second solid polymer electrolytes, it is preferably applied on the solid polymer electrolyte membrane 114. While the substrate such as carbon paper has a concavo-convex shape on its surface, the solid polymer electrolyte membrane 114 has a comparatively flat surface and the adhesion performance is improved when the application liquid is applied on such the flat surface.

EXAMPLES

Although the electrode for the solid polymer electrolyte fuel cell and the fuel cell using the same in accordance with the present invention will be hereinafter described more in detail by showing Examples, the present invention is not restricted to these Examples.

Example 1

In the present Example, Nafion was used as a first solid polymer electrolyte, and sulfonated poly(4-phenoxybenzoyl-1,4-phenylene) (hereinafter referred to as "PPBP") was used as a second solid polymer electrolyte. The first solid polymer electrolyte configures a part of a catalyst layer on an electrode surface, and the second solid polymer electrolyte configures a part of a catalyst layer on the electrode surface and a solid polymer electrolyte membrane. In the present Example, platinum was used as a precious metal catalyst in both of a fuel electrode and an oxidant electrode.

A method of fabricating a fuel cell of the present Example will be described referring to FIG. 2.

After 500 g of dinitrodiamine platinum nitric acid solution containing 3% of platinum which acted as the catalyst in the fuel electrode 102 and the oxidant electrode 108 was mixed with 10 g of acetylene black (Denka Black (registered trademark, available from Denki Kagaku Kogyo K.K.) and stirred, 60 ml of 98% ethanol acting as a reducing agent was added. The solution was mixed under stirring at about 95 for 8 hours to support the catalyst on the acetylene black particles. Then, the filtration of the solution followed by the drying provided the carbon particles supporting the catalyst. An amount of the supported platinum was about 50% with respect to the weight of the acetylene black.

Nafion was adsorbed on the catalyst and the carbon particle surfaces by the mixing of 200 g of the above catalyst-supported carbon particles with 3.5 ml of 5% Nafion solution (alcoholic solution, available from Aldrich Chemical). The dispersion liquid thus obtained was dispersed at 50 for 3 hours by using an ultrasonic dispersing apparatus to make the liquid paste-like, thereby providing paste "A". After the paste "A" was applied on substrates made of carbon paper (available from Toray Industries, Inc., TGP-H-120) by using the screen printing method, they were heated at 100 for drying to provide the fuel electrode 102 and the oxidant electrode 108. An amount of the platinum on the electrode surfaces was 0.1 to 0.4 mg/cm$^2$.

Then, 10 g of pulverized poly(4-phenoxybenzoyl-1,4-phenylene) was suspended in 100 ml of 95% sulfuric acid followed by the stirring for 200 hours to achieve the sulfonation treatment. After the PPBP thus obtained was rinsed with a sufficient amount of distilled water, dried and pulverized, it was dissolved into a dimethylformamide solution. This is referred to as solution "A".

The solution "A" was cast on a Teflon (registered trademark) sheet and dried to provide the solid polymer electrolyte membrane 114 having a dimension of 10 cm×10 cm and thickness of 30 m.

On the other hand, the above solution "A" was applied on the surfaces of the fuel electrode 102 and the oxidant electrode 108. The application method was the brush application method. After the application, the electrodes were dried to form adhesion layers 161 on the surfaces of the both electrodes.

The solid polymer electrolyte membrane 114 was sandwiched between the both electrodes and hot-pressed under the conditions at a temperature of 150, at a pressure of 10 kgf/cm$^2$ and for 10 seconds to provide a membrane electrode assembly. Then, the membrane electrode assembly was mounted on a single cell measuring apparatus to fabricate a single cell.

The current-voltage characteristic of the cell was measured while 10% in weight of methanol solution and oxygen (1.1 atm., 25) were supplied to the single cell as fuels. As a result, an open-circuit voltage of 0.54V and a short-circuit current of 0.18 A/cm$^2$ were continuously observed.

The electrodes exhibited the excellent adhesion to the solid polymer electrolyte membrane, and was confirmed to effectively function for the direct methanol fuel cell using methanol as fuel.

Figure 3:
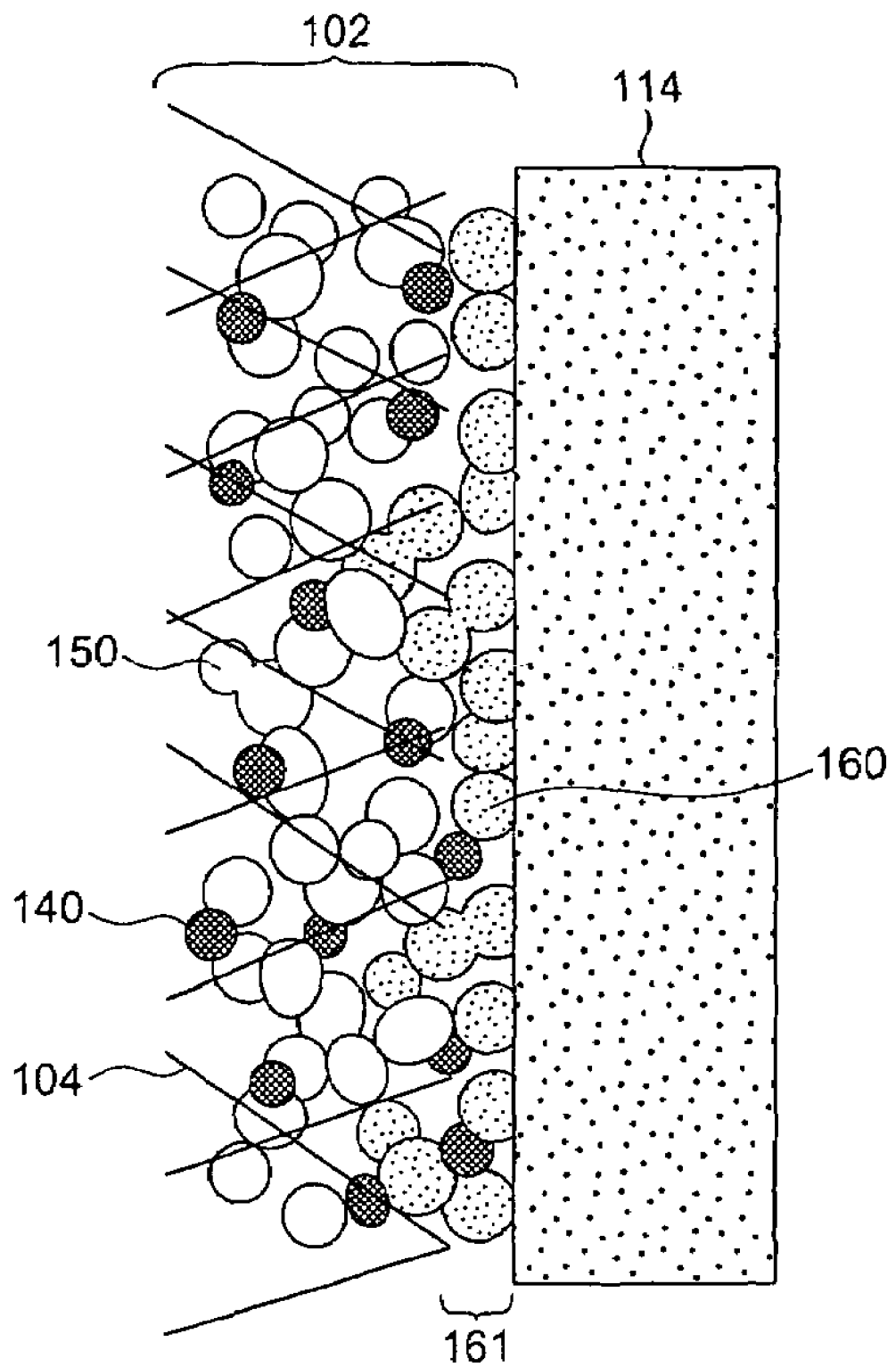
FIG. 3 is a view schematically showing a fuel electrode and a solid polymer electrolyte membrane in a fuel cell in an embodiment of the present invention.

FIG. 3 is a view schematically showing the fuel electrode 102 and the solid polymer electrolyte membrane 114 and the adhesion layer 161 sandwiched therebetween in the fuel cell of the present Example. As shown therein, the catalyst layer of the fuel electrode 102 of the present Example contains the first solid polymer electrolyte 150 made of Nafion and carbon particles 140 supporting a catalyst (not shown). The adhesion layer 161 contains the second solid polymer electrolyte 160 made of PPBP as a main component. The solid polymer electrolyte membrane 114 is made of PPBP. Since both of the adhesion layer 161 and the solid polymer electrolyte membrane 114 contain PPBP, the adhesion between the both is excellent. On the other hand, the adhesion between the adhesion layer 161 and the fuel electrode 102 is also excellent because the particles of Nafion and PPBP are bonded in the intertwisted state. From the above description, it is supposed that the adhesion layer 161 acts as a binder between the solid polymer electrolyte membrane 114 and the fuel electrode 102 to make the joining between the solid polymer electrolyte membrane 114 and the fuel electrode 102 excellent, thereby contributing to the excellent operation of the fuel cell of the present Example.

The methanol permeabilities and the water contents of PPBP and Nafion are shown in Table 1.

TABLE 1

|  | PPBP | Nafion |
| --- | --- | --- |
| Methanol Permeability (.mol/cm$^2$/hr) | 250 | 600 |
| Water Content (% in weight) | 12 | 20 |

In the present Example, the methanol permeation in the solid polymer electrolyte membrane 114 is suppressed because the materials having the lower methanol permeability and the lower water content than those of the first solid polymer electrolyte are selected for the solid polymer electrolyte membrane 114 and the second solid polymer electrolyte 160. In this manner, it is supposed that the reduction of the cell performances due to the crossover is suppressed to provide the fuel cell having the excellent cell characteristics.

Example 2

Also in the present Example, Nafion was used as the first solid polymer electrolyte, and PPBP was used as the second solid polymer electrolyte. Also in the present Example, platinum was used as the catalyst for the fuel electrode and the oxidant electrode.

The fuel electrode 102, the oxidant electrode 108 and the solid polymer electrolyte membrane 114 were fabricated similarly to Example 1. PPBP and the catalyst-supported carbon particles fabricated similarly to Example 1 were dissolved into a dimethylformamide solution to obtain paste "B". The paste "B" was applied on the surfaces of the fuel electrode 102 and the oxidant electrode 108 by using the brush application method followed by drying to form adhesion layers 161 on the surfaces of the respective electrodes.

The solid polymer electrolyte membrane 114 was sandwiched between the both electrodes and hot-pressed under the conditions at a temperature of 150, at a pressure of 10 kgf/cm$^2$ and for 10 seconds to provide a membrane electrode assembly. Then, the membrane electrode assembly was mounted on a single cell measuring apparatus an apparatus to fabricate a single cell.

The current-voltage characteristic of the cell was measured while 10% in weight of methanol solution and oxygen (1.1 atm., 25) were supplied to the single cell as fuels. As a result, an open-circuit voltage of 0.54V and a short-circuit current of 0.19 A/cm$^2$ were continuously observed.

Figure 5:
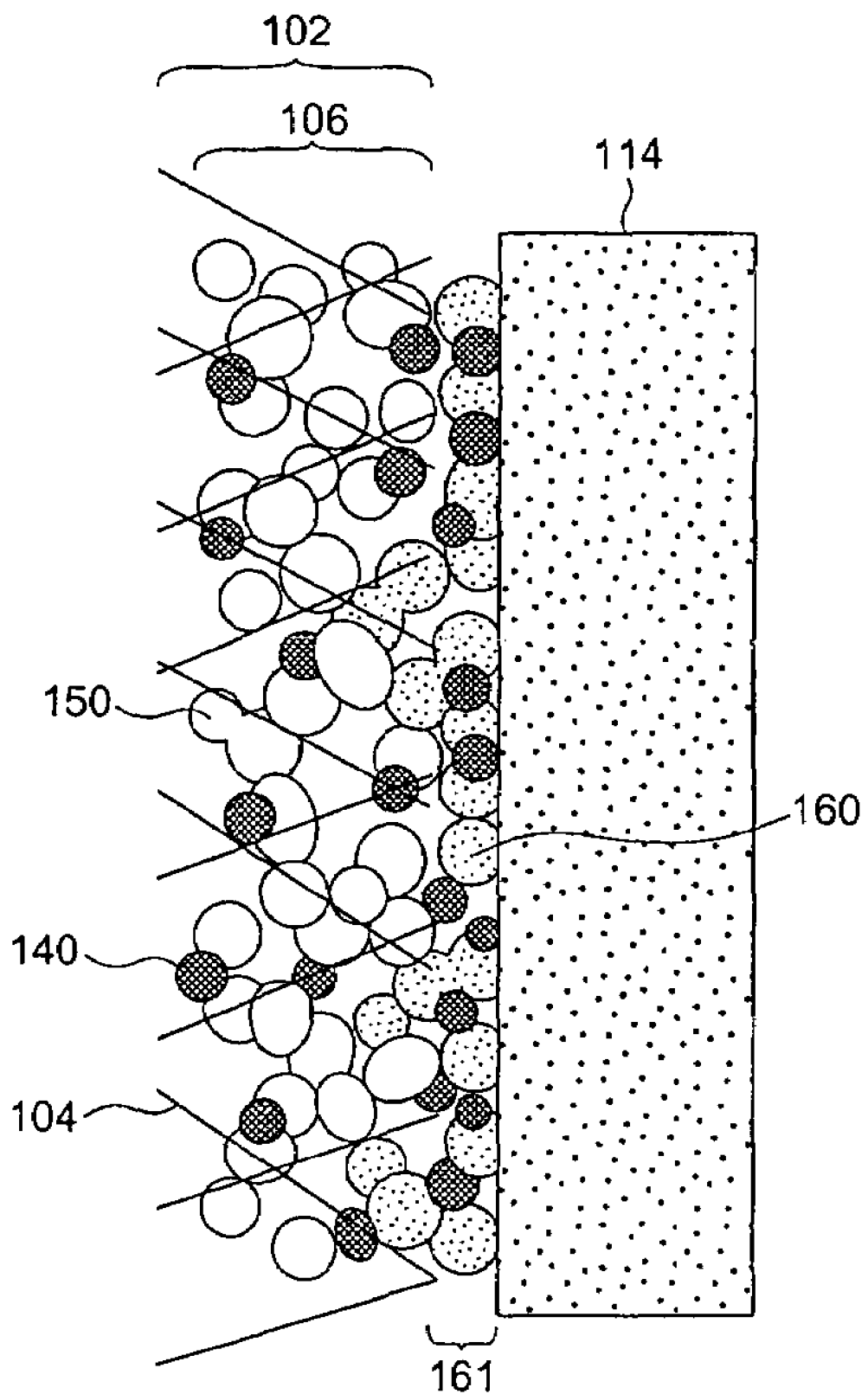
FIG. 5 is a view schematically showing a fuel electrode, a solid polymer electrolyte membrane and an adhesion layer sandwiched therebetween in a fuel cell in an embodiment of the present invention.

FIG. 5 is a view schematically showing the fuel electrode 102, the solid polymer electrolyte membrane 114 and the adhesion layer 161 sandwiched therebetween in the fuel cell of the present Example. As shown therein, the adhesion layer 161 contains PPBP and the carbon particles 140. Since both of the adhesion layer 161 and the solid polymer electrolyte membrane 114 contain PPBP, the adhesion between the both is excellent. On the other hand, the adhesion between the adhesion layer 116 and the fuel electrode 102 is also excellent because the particles of Nafion and PPBP are bonded in the intertwisted state. The electro-conductive carbon particles 140 contained also in the adhesion layer 161 makes the electron conductivity of the adhesion layer excellent. From the above description, it is supposed that the adhesion layer contributes to the excellent operation of the fuel cell of the present Example because the existence of the adhesion layer 161 makes the joining between the solid polymer electrolyte membrane 114 and the fuel electrode 102 excellent, and the organic liquid fuel can be consumed in the adhesion layer to make the electron conductivity of the adhesion layer excellent.

Example 3

Also in the present Example, Nafion was used as the first solid polymer electrolyte, and PPBP was used as the second solid polymer electrolyte. Also in the present Example, platinum was used as the catalyst for the fuel electrode and the oxidant electrode.

The fuel electrode 102, the oxidant electrode 108 and the solid polymer electrolyte membrane 114 were fabricated similarly to Example 1. The solution "A" of PPBP obtained similarly to the method of Example 1 was mixed with the paste "A" of Nafion obtained similarly to the method of Example 1 to obtain paste "C" and paste "D". At this stage, a weight ratio between Nafion and PPBP in the paste "C" is 1:1. A weight ratio between Nafion and PPBP in the paste "D" is 4:1.

A first, the paste "C" was applied on both surfaces of the solid polymer electrolyte membrane 114 by using the brush application method, and dried. Then, the paste "D" was applied on the paste "C" by using the brush application method, and dried. In this manner, the adhesion layers 161 made of the paste "C" and the paste "D" were formed on the both surfaces of the solid polymer electrolyte membrane 114. A membrane electrode assembly was fabricated by using these by means of hot-pressing similarly to Example 1. This membrane electrode assembly was mounted on a single cell measuring apparatus to fabricate a single cell.

The current-voltage characteristic of the cell was measured while 10% in weight of methanol solution and oxygen (1.1 atm., 25) were supplied to the single cell as fuels. As a result, an open-circuit voltage of 0.54V and a short-circuit current of 0.19 A/cm$^2$ were continuously observed.

Figure 6:
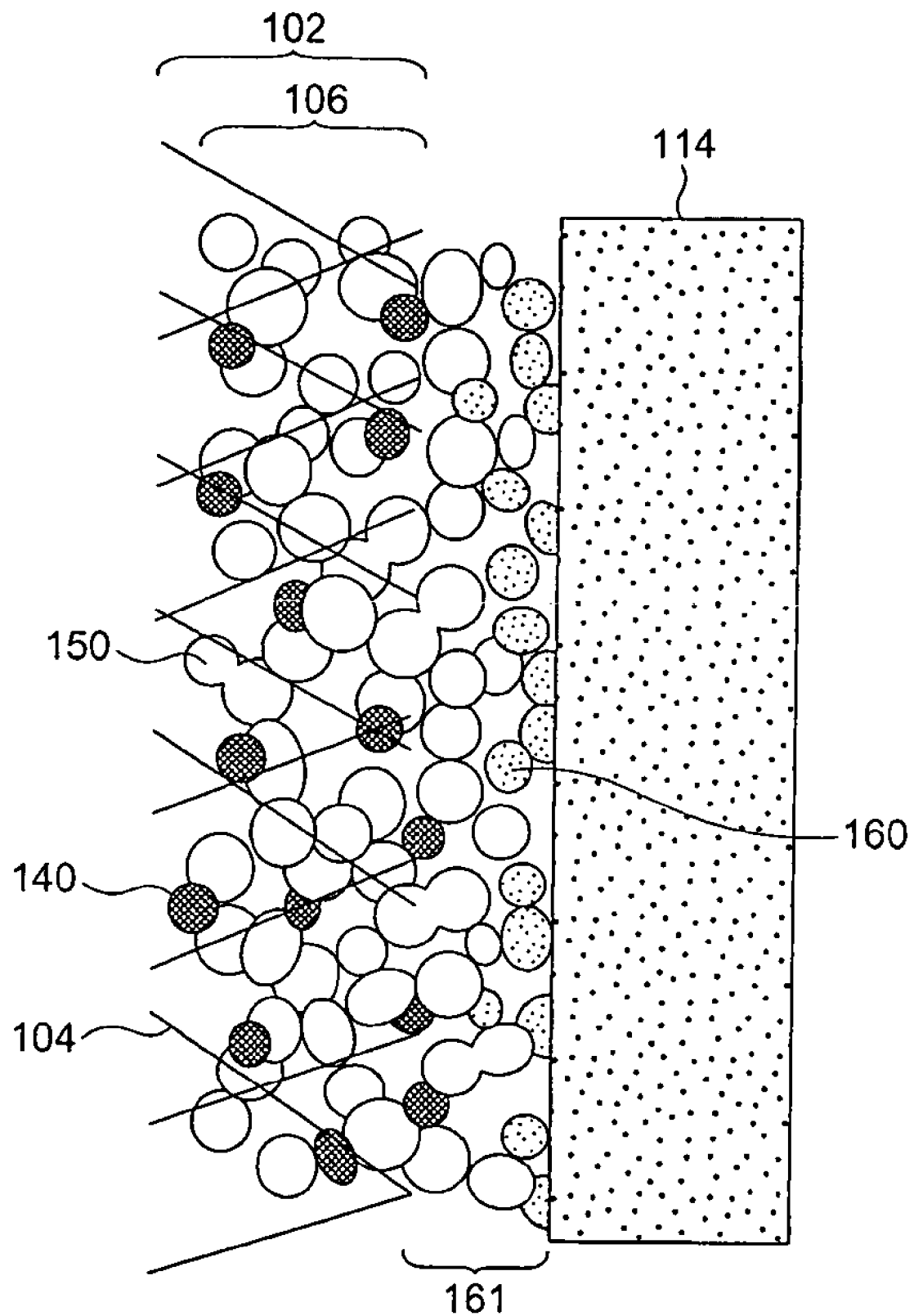
FIG. 6 is a view schematically showing a fuel electrode, a solid polymer electrolyte membrane and an adhesion layer sandwiched therebetween in a fuel cell in an embodiment of the present invention.

FIG. 6 is a view schematically showing the fuel electrode 102, the solid polymer electrolyte membrane 114 and the adhesion layer 161 sandwiched therebetween in the fuel cell of the present Example. As shown therein, the adhesion layer 161 has the configuration such that the content of the second solid polymer electrolyte 160 (PPBP) in a region near to the solid polymer electrolyte membrane 114 is higher and the content of the first solid polymer electrolyte 150 (Nafion) in a region near to the catalyst layer 106 is higher. Because of the higher content of PPBP in the region near to the solid polymer electrolyte membrane 114 in the adhesion layer 161, the adhesion between the both is excellent. On the other hand, because of the higher content of Nafion in the region near to the catalyst layer 106 in the adhesion layer 161, the adhesion between the adhesion layer 161 and the fuel electrode 102 is also excellent. From the above description, it is supposed that the adhesion layer contributes to the excellent operation of the fuel cell of the present Example because the existence of the adhesion layer 161 makes the joining between the solid polymer electrolyte membrane 114 and the fuel electrode 102 excellent.

Example 4

Also in the present Example, Nafion was used as the first solid polymer electrolyte, and PPBP was used as the second solid polymer electrolyte. Also in the present Example, platinum was used as the catalyst for the fuel electrode and the oxidant electrode.

The fuel electrode 102, the oxidant electrode 108 and the solid polymer electrolyte membrane 114 were fabricated similarly to Example 1. Paste "E" and paste "F" were prepared by adding 200 mg of catalyst-supported carbon particles to the paste "C" and the paste "D" similarly to those of Example 3, respectively.

A first, the paste "E" was applied on both surfaces of the solid polymer electrolyte membrane 114 by using the brush application method, and dried. Then, the paste "F" was applied on the paste "E" by using the brush application method, and dried. In this manner, the adhesion layers 161 made of the paste "E" and the paste "F" were formed on the both surfaces of the solid polymer electrolyte membrane 114. A membrane electrode assembly was fabricated by using these by means of hot-pressing similarly to Example 1. This membrane electrode assembly was mounted on a single cell measuring apparatus to fabricate a single cell.

The current-voltage characteristic of the cell was measured while 10% in weight of methanol solution and oxygen (1.1 atm., 25) were supplied to the single cell as fuels. As a result, an open-circuit voltage of 0.54V and a short-circuit current of 0.20 A/cm$^2$ were continuously observed.

Figure 7:
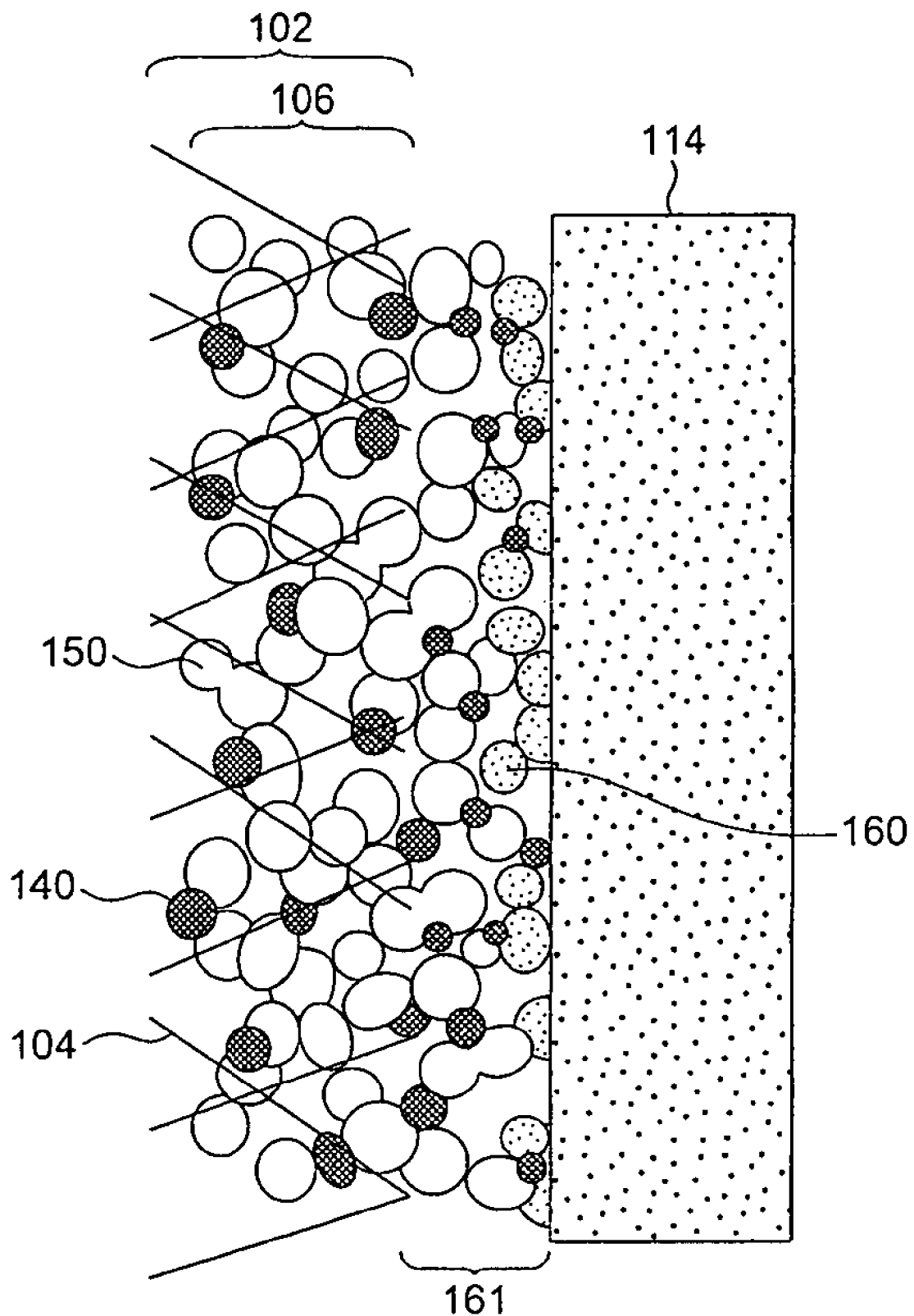
FIG. 7 is a view schematically showing a fuel electrode, a solid polymer electrolyte membrane and an adhesion layer sandwiched therebetween in a fuel cell in an embodiment of the present invention.

FIG. 7 is a view schematically showing the fuel electrode 102 and the solid polymer electrolyte membrane 114 and the adhesion layer 161 sandwiched therebetween in the fuel cell of the present Example. As shown therein, the adhesion layer 161 has the configuration such that the content of the second solid polymer electrolyte 160 (PPBP) in a region near to the solid polymer electrolyte membrane 114 is higher and the content of the first solid polymer electrolyte 150 (Nafion) in a region near to the catalyst layer 106 is higher. The adhesion layer 161 contains also carbon particles 140. Similarly to Example 3, the existence of the adhesion layer 161 makes the joining between the solid polymer electrolyte membrane 114 and the fuel electrode 102 excellent in the present Example. The electron conductivity of the adhesion layer 161 can be made excellent by the electro-conductive carbon particles 140 contained in the adhesion layer 161. In this manner, it is supposed that the fuel cell of the present invention exhibits the significant operation.

Comparative Example 1

The configuration of the present Comparative Example is such that Nafion was used as both of the first solid polymer electrolyte configuring the fuel electrode 102 and the oxidant electrode 108 and of the second solid polymer electrolyte configuring the solid polymer electrolyte membrane 114, and no adhesion layer was disposed. The first solid polymer electrolyte configures a part of the catalyst layer on the electrode surface, and the second solid polymer electrolyte configures a part of the catalyst layer on the electrode surface and the solid polymer electrolyte membrane.

The solid polymer electrolyte membrane 114 was fabricated similarly to the method of the above Examples except that PPBP was replaced with Nafion.

The fuel electrode 102 and the oxidant electrode 108 were fabricated similarly to Example 1.

Then, the membrane electrode assembly was obtained by sandwiching the solid polymer electrolyte membrane 114 between the fuel electrode 102 and the oxidant electrode 108 followed by the hot-pressing under conditions of a temperature of 150, of a pressure of 10 kgf/cm$^2$ and for 10 seconds.

Then, the membrane electrode assembly was mounted on a single cell measuring apparatus to fabricate a single cell.

The current-voltage characteristic of the cell was measured while 10% in weight of methanol solution and oxygen (1.1 atm., 25) were supplied to the single cell as fuels. As a result, an open-circuit voltage of 0.45V and a short-circuit current of 0.09 A/cm² were observed.

It is supposed that the reduction of the cell efficiency was due to the occurrence of the crossover of the methanol from the fuel electrode to the oxidant electrode in the present Comparative Example.

Comparative Example 2

The configuration of the present Comparative Example is such that PPBP was used as both of the first solid polymer electrolyte and the second solid polymer electrolyte, and no adhesion layer 161 was disposed. The first solid polymer electrolyte configures a part of the catalyst layer on the electrode surface, and the second solid polymer electrolyte configures the solid polymer electrolyte membrane.

The solid polymer electrolyte membrane 114 was fabricated similarly to the method of the above Examples by using PPBP.

The fuel electrode 102 and the oxidant electrode 108 were fabricated in accordance with the following procedures. At first, catalyst-supported carbon particles obtained similarly to Example 1 were added to the solution "A" (containing PPBP) of Example 1 to provide a dispersion liquid. The dispersion liquid thus provided was dispersed at 50. for 3 hours by using an ultrasonic dispersing apparatus to make the liquid paste-like, thereby providing paste "B". After the paste "B" was applied on a substrate 104 and a substrate 110 made of carbon paper (available from Toray Industries, Inc., TGP-H-120) by using the screen printing method, they were heated at 100 for drying to provide the fuel electrode 102 and the oxidant electrode 108. An amount of the platinum on the electrode surfaces thus obtained was 0.1 to 0.4 mg/cm².

Then, the membrane electrode assembly was obtained by sandwiching the solid polymer electrolyte membrane 114 between the fuel electrode 102 and the oxidant electrode 108 followed by the hot-pressing under conditions of a temperature of 150, of a pressure of 10 kgf/cm² and for 10 seconds.

Further, the membrane electrode assembly was mounted on a single cell measuring apparatus to fabricate a single cell. Although the discharge test similarly to those of the above Examples was conducted, no stable discharge could be observed.

The present Comparative Example has the configuration in which the first solid polymer electrolyte 150 (Nafion) in FIG. 3 is replaced with the second solid polymer electrolyte 160 (PPBP). The second solid polymer electrolyte 160 (PPBP) is inferior to the first solid polymer electrolyte 150 (Nafion) in the methanol permeability and the water content as shown in Table 1. Accordingly, it is supposed that the insufficient movement of the hydrogen ion from the fuel electrode to the oxidant electrode does not stably operate the cell.

Comparative Example 3

The configuration of the present Comparative Example is such that Nafion was used as the first solid polymer electrolyte and PPBP was used as the second solid polymer electrolyte, and no adhesion layer 11 was disposed. The first solid polymer electrolyte configures a part of the catalyst layer on the electrode surface, and the second solid polymer electrolyte configures the solid polymer electrolyte membrane.

After the fuel electrode 102, the oxidant electrode 108 and the solid polymer electrolyte membrane 114 were fabricated similarly to Example 1, the fuel electrode 102, the oxidant electrode 108, and the solid polymer electrolyte membrane 114 were thermally bonded under pressure. However, they were insufficiently bonded with each other, and the cell worth evaluating could not be obtained.

When platinum-ruthenium alloy was used as a precious metal catalyst of the oxidant electrode 108 in the above Examples, the cell characteristics with further stability could be obtained.

Since the above embodiments are described only for examples, the present invention is not limited to the above embodiments and various modifications or alterations can be easily made therefrom by those skilled in the art without departing from the scope of the present invention.

The invention claimed is:

1. A fuel cell comprising a catalyst electrode containing a first solid polymer electrolyte including fluorine-containing polymer containing fluorine, and a catalyst substance; a solid polymer electrolyte membrane including fluorine-free polymer; and an adhesion layer including a second solid polymer electrolyte including fluorine-free polymer, and a catalyst substance, and sandwiched between the catalyst electrode and the solid polymer electrolyte membrane.

2. The fuel cell as defined in claim 1, wherein the second solid polymer electrolyte has higher adhesion to the solid polymer electrolyte membrane than the first solid polymer electrolyte has.

3. The fuel cell as defined in claim 1, wherein the second solid polymer electrolyte includes a solid polymer electrolyte comprising the solid polymer electrolyte membrane or its derivative.

4. The fuel cell as defined in claim 1, wherein organic liquid fuel permeability of the second solid polymer electrolyte is lower than that of the first solid polymer electrolyte.

5. The fuel cell as defined in claim 1, wherein a water content of the second solid polymer electrolyte is lower than that of the first solid polymer electrolyte.

6. The fuel cell as defined in claim 1, wherein both of the first solid polymer electrolyte and the second solid polymer electrolyte contain protonic acid group.

7. The fuel cell as defined in claim 1, wherein the second solid polymer electrolyte contains polymer having aromatic group.

8. A method of fabricating the fuel cell as defined in claim 1 comprising the steps of:
    forming the catalyst electrode by applying a first application liquid containing electro-conductive particles supporting catalyst metal and the first solid polymer electrolyte on a substrate;
    forming the adhesion layer by applying a second application liquid containing electro-conductive particles supporting catalyst metal and the second solid polymer electrolyte on the catalyst electrode; and
    thermally bonding the catalyst electrode, the adhesion layer and the solid polymer electrolyte membrane under pressure in a state in which the adhesion layer and the solid polymer electrolyte membrane are in contact with each other.

9. A method of fabricating the fuel cell as defined in claim 1 comprising the steps of:
    forming the catalyst electrode by applying a first application liquid containing electro-conductive particles supporting catalyst metal and the first solid polymer electrolyte on a substrate;
    forming the adhesion layer by applying a second application liquid containing electro-conductive particles supporting catalyst metal and the second solid polymer electrolyte on the solid polymer electrolyte membrane; and thermally bonding the catalyst electrode, the adhesion layer and the solid polymer electrolyte membrane under pressure in a state in which the catalyst electrode and the adhesion layer are in contact with each other.

10. A fuel cell comprising a catalyst electrode containing a first solid polymer electrolyte which contains fluorine-containing polymer, and a catalyst substance; a solid polymer electrolyte membrane which contains fluorine-free polymer; and an adhesion layer containing a second solid polymer electrolyte which contains fluorine-free polymer, and sandwiched between the catalyst electrode and the solid polymer electrolyte membrane.

11. The fuel cell as defined in claim 10, wherein the second solid polymer electrolyte has higher adhesion to the solid polymer electrolyte membrane than the first solid polymer electrolyte has.

12. The fuel cell as defined in claim 10, wherein the second solid polymer electrolyte contains a solid polymer electrolyte comprising the solid polymer electrolyte membrane or its derivative.

13. The fuel cell as defined in claim 10, wherein organic liquid fuel permeability of the second solid polymer electrolyte is lower than that of the first solid polymer electrolyte.

14. The fuel cell as defined in claim 10, wherein a water content of the second solid polymer electrolyte is lower than that of the first solid polymer electrolyte.

15. The fuel cell as defined in claim 10, wherein both of the first solid polymer electrolyte and the second solid polymer electrolyte contain protonic acid group.

16. The fuel cell as defined in claim 10, wherein the second solid polymer electrolyte contains polymer having aromatic group.

17. A method of fabricating the fuel cell as defined in claim 10 comprising the steps of:
   forming the catalyst electrode by applying a first application liquid containing electro-conductive particles supporting catalyst metal and the first solid polymer electrolyte on a substrate;
   forming the adhesion layer by applying a second application liquid containing the second solid polymer electrolyte on the catalyst electrode; and
   thermally bonding the catalyst electrode, the adhesion layer and the solid polymer electrolyte membrane under pressure in a state in which the adhesion layer and the solid polymer electrolyte membrane are in contact with each other.

18. A method of fabricating the fuel cell as defined in claim 10 comprising the steps of:
   forming the catalyst electrode by applying a first application liquid containing electro-conductive particles supporting catalyst metal and the first solid polymer electrolyte on a substrate;
   forming the adhesion layer by applying a second application liquid containing the second solid polymer electrolyte on the solid polymer electrolyte membrane; and
   thermally bonding the catalyst electrode, the adhesion layer and the solid polymer electrolyte membrane under pressure in a state in which the catalyst electrode and the adhesion layer are in contact with each other.

* * * * *